Patented May 15, 1951

2,552,520

UNITED STATES PATENT OFFICE 2,552,520

LIQUID COMPOSITIONS FOR REMOVING ADHESIVE DRESSINGS

Myron A. Coler, New York, N. Y., assignor to Synergistics, Inc., New York, N. Y., a corporation of New York No Drawing. Application August 18, 1947, Serial No. 769,321

3 Claims. (Cl. 252—170)

This invention relates to liquid compositions adapted to facilitate the removal of adhesive plasters, tapes and like dressings from skin to which they have been applied.

In spite of the widespread use of adhesive plasters and tapes for several decades, no practical progress has been made to date in removing these adhesive dressings from the skin. As known to the medical profession and laymen as well, the stripping of adhesive tape and the like from a patient's skin continues to be difficult and painful. Generally, the longer the adhesive dressing has been on the skin, the more arduous and unpleasant is the task of removing it. In addition, the dressing is often applied in the vicinity of a recent incision or wound which makes that vicinity very sensitive or sore; the changing of dressings in such cases can be excruciating. The hair on the skin over which an adhesive tape or plaster has been applied further intensifies the difficulties in removing the dressing.

Various solvents have been tried to facilitate the stripping of adhesive dressings from skin but none has been found which is entirely satisfactory. People often resort to such common organic solvents as benzene, naphtha, ether, chloroform, acetone, mineral oil and alcohol with the hope of lessening the difficulty and pain of stripping an adhesive dressing. Some of the solvents affect the adhesive in such a manner that the tape or cloth can be peeled off without much trouble but a sticky layer of the adhesive persists on the skin, requiring considerable rubbing and soaking with solvent before it can be completely cleaned off; the skin can become more irritated from the after-cleaning operation than if the dressing had been stripped off without the benefit of such a solvent. Other liquids fail because they soften the adhesive coating of the tape or plaster thereby increasing its tackiness to hair. Still others are unsatisfactory because they only slightly decrease the tenacity of the bond between the skin and the adhesive dressing.

The primary object of my invention is to provide liquid compositions which when spread over an adhesive tape or plaster applied to the skin will permit the removal of the tape or plaster with practically no residue of adhesive substance remaining on the skin and with substantially no pain to the patient.

Other objects of the invention will be apparent hereinafter.

I have discovered that liquid preparations particularly adapted to facilitate the removal of adhesive dressings from skin to which they have been applied are made up by combining two classes of materials. I shall refer to one group of materials as the elastomer solvents, i. e., liquids which dissolve or at least soften elastomers, and the other group as the adjuvants. As known, elastomer is a generic term for all substances having the properties of natural, reclaimed, vulcanized or synthetic rubber. My preferred elastomer solvents include hydrocarbons, both cyclic and acyclic, and oxygenated aliphatic compounds of the class of ketones, ethers and esters. Representative members of the group well suited for the purposes of my invention are benzene, toluene, xylene, naphtha, kerosene, mineral oil, methylcyclohexane, cyclohexanone, methyl ethyl ketone, isopropyl ether and ethyl acetate. I generally choose as elastomer solvent a liquid having a vapor pressure below 150 mm. Hg at a temperature of 20° C. The adjuvants are hydroxylated compounds selected from the aliphatic alcohols and their derivatives in the form of ethers and esters provided there is at least one free hydroxyl group in the derivative. Typical adjuvants useful in this invention comprise propanols, butanols, ethylene glycol, propylene glycol, glycerin, diethylene glycol, dipropylene glycol, glycerin mono-oleate and diethylene glycol monolaurate. My preferred adjuvants are aliphatic alcohols of 2 to 4 carbon atoms and ether-linked polymers of the glycols.

The use of an elastomer solvent in my liquid compositions is necessitated because the adhesive coating on tapes and plasters for application on skin contain an elastomer such as natural or synthetic rubber. The elastomer solvent acts principally to dissolve or soften the adhesive coating so that there is considerably less pull on the skin when the tape or plaster is peeled off. The adjuvant which is admixed with the elastomer solvent appears to function in several different ways. First, it prevents the adhesive coating from losing its bond to the tape or plaster fabric while permitting the elastomer solvent to destroy or materially weaken the bond to the skin; this preferential action which makes it possible to strip an adhesive dressing from the skin substantially without causing discomfort and leaving any deposit on the skin seems attributable to the absorption of the adjuvant in the fibrous sheet of the tape or plaster, the absorbed adjuvant nullifying or suppressing the action of the elastomer solvent in the immediate vicinity of the tape or plaster to the extent that when the dressing is pulled up separation readily occurs between the adhesive coating and the skin. Another possible explanation of the beneficial effects of adjuvants is that they wet the skin and thus impair the bond of the adhesive coating thereto. Regardless of my theories, it can be easily demonstrated that a mixture of an elastomer solvent and a hydroxylated adjuvant when spread on the back of an adhesive dressing will greatly facilitate its stripping from the skin to which it has been attached.

The proportions in which the elastomer solvent and adjuvant are combined will vary with the particular ingredients used. Thus, an elastomer solvent such as benzene or methylcyclohexane which acts on the adhesive coating more quickly than say mineral oil will require more adjuvant. The proportions in which any elastomer solvent and adjuvant should be combined to achieve the purposes of this invention are readily determined by simple tests. If a 50–50 volume mixture of a given elastomer solvent and adjuvant tends to leave a sticky deposit of the adhesive coating on the skin, the proportion of adjuvant should be increased. Conversely, if the 50–50 mixture does not permit the stripping of an adhesive dressing without appreciable pulling on the skin and hair, the proportion of elastomer solvent should be raised.

In some instances, the elastomer solvent and adjuvant may not be miscible in all proportions. Thus, if 60% by volume of xylene and 40% by volume of propylene glycol are brought together, two immiscible phases will form. In such instances, a mutual solvent may be added to yield a homogeneous liquid composition or it may be found that one of the phases has a composition which makes it effective for the purposes of my invention.

After working with a wide variety of elastomer solvents and adjuvants, I have found that the desirable liquid compositions of my invention are essentially mixtures of elastomer solvents and adjuvants in proportions falling in the ranges of 15 to 75% by volume of elastomer solvent and 85 to 25% by volume of adjuvant. My preferred compositions contain about 50 to 75% by volume of elastomer solvent and about 50 to 25% by volume of adjuvant.

It is well to note that liquid compositions which are particularly satisfactory in the removal of adhesive dressings are those having viscosities not higher than 5 centipoises at a temperature of 20° C. and having surface tensions against air not higher than 30 dynes per centimeter at a temperature of 20° C. A liquid composition of low viscosity and low surface tension will in general penetrate an adhesive dressing more readily and thus more rapidly weaken the bond between the adhesive coating of the dressing and the skin to which it is attached.

Illustrative formulations of effective liquid compositions for the removal of adhesive dressings are now given to indicate the scope of my invention. In the table which follows, the percentages shown refer to liquid volume.

| Example No | 1 | 2 | 3 | 4 | 5 | 6 | 7 | 8 | 9 | 10 | 11 | 12 |
|---|---|---|---|---|---|---|---|---|---|---|---|---|
| Elastomer Solvents: | | | | | | | | | | | | |
| Benzene | | | | | | 60 | 45 | | | | | 20 |
| Naphtha | 16 | | | | | | | | | 14 | 5 | |
| Refined Kerosene | | | | | | | | 11 | | 10 | | |
| Ethyl Acetate | | 49 | 60 | 75 | 75 | | 22 | | 75 | | | |
| Isopropyl Acetate | | | | | | | | 55 | | | | |
| Methyl Ethyl Ketone | | | | | | | | | | | 45 | |
| Adjuvants: | | | | | | | | | | | | |
| Ethanol | | | | | | | | | 9 | | | |
| Isopropanol | 84 | 48 | | | | | 22 | 9 | | 76 | 50 | |
| t-Butanol | | | | | | | | | | | | 80 |
| Propylene Glycol | | | 40 | | | | | | | | | |
| Diethylene Glycol | | | | 25 | | | | | | | | |
| Diethylene Glycol Monolaurate | | | | | | 40 | 10 | 16 | | | | |
| Triethylene Glycol | | | | | | | | | | 25 | | |
| Glyceryl Mono-Oleate | | | | | 25 | | | | | | | |
| Auxiliaries: | | | | | | | | | | | | |
| 40% Formalin | | 2 | | | | | | | | | | |
| Perfume | | 1 | | | | | | | | | | |
| Oil Lemon Grass | | | | | | | 1 | | | | | |
| Chlorophyll | | | | | | | | | (1) | | | |
| Phenolphthalein | | | | | | | | | | | (2) | |
| KOH | | | | | | | | | | | (3) | |

¹ Small amount of chlorophyll was dissolved in the ethanol to color the liquid product green.
² Approximately 0.1% by weight of phenolphthalein was dissolved in the isopropanol.
³ Approximately 0.5% by weight of potassium hydroxide was dissolved in the isopropanol. Because of (²) and (³), formula No. 10 had a pleasant red color.

As is evident in the foregoing table, auxiliary substances may be added to my liquid compositions to impart thereto desirable coloration and odor. Formula No. 10 is particularly noteworthy since it involves a fugitive color of the type described in detail in my copending application Serial No. 646,707, filed February 9, 1946 and issued as U. S. Patent 2,496,270 on February 7, 1950. The red color of formula No. 10 serves to delineate more clearly the area over which it is applied so as to avoid skips on the adhesive dressing. Obviously, every skip is a spot where pain and irritation will be felt when the adhesive dressing is pulled up from the skin. The red color is fugitive in nature, that is to say, within a few minutes after it has been spread over the desired area the color vanishes because of exposure to the atmosphere. The fugitive color may be made to disappear in a period corresponding to the time required for the liquid composition to penetrate the adhesive dressing; therefore, the disappearance of the color may indicate the time when to start the stripping of the adhesive tape or plaster from the skin.

Other auxiliary substances which may be incorporated in my liquid compositions include analgesics and anaesthetics such as menthol, benzocaine and procaine, especially when the liquid compositions are to be applied on sensitive or sore portions of the body. Antiseptic and germicidal agents such as formalin, phenol and thymol may also be added. In general, my liquid compositions for the removal of adhesive dressings will contain less than 10% by volume of auxiliary substances, and frequently less than 5%.

The foregoing description and examples are intended to be illustrative only. Variations of my invention conforming to its spirit are to be considered within the scope of the appended claims.

What I claim is:

1. A liquid composition for application on the backs of elastomer adhesive dressings attached to skin to facilitate their removal, which consists essentially of ethyl acetate and isopropanol in approximately equal volumes, in combination with a mixture of phenolphthalein and an alkaline agent, said mixture imparting to said composition a red color contrasting with that of adhesive dressings and skin thereby to facilitate application of said composition on adhesive dressings and skin and said mixture being adapted to lose rapidly its color-imparting role through exposure to the atmosphere when said composition is applied on adhesive dressings and skin.

2. A homogeneous liquid composition adapted to facilitate the removal of elastomer adhesive dressings from skin, which consists essentially of ethyl acetate and an alcohol of from two to four carbon atoms, said ethyl acetate and said alcohol being admixed in volume proportions in the ranges of about 50 to 75% and about 50 to 25%, respectively, to weaken preferentially the bond of the elastomer adhesive layer of said dressings to the skin, in combination with a mixture of phenolphthalein and an alkaline agent, said mixture imparting to said composition a red color contrasting with that of adhesive dressings and skin thereby to facilitate application of said composition on adhesive dressings and skin and said mixture being adapted to lose rapidly its color-imparting role through exposure to the atmosphere when said composition is applied on adhesive dressings and skin.

3. The liquid composition of claim 2 wherein said alcohol is isopropanol.

MYRON A. COLER.

REFERENCES CITED

The following references are of record in the file of this patent:

UNITED STATES PATENTS

| Number | Name | Date |
|---|---|---|
| 1,571,829 | Wiese | Feb. 2, 1926 |
| 1,884,767 | Lougovoy | Oct. 25, 1932 |

FOREIGN PATENTS

| Number | Country | Date |
|---|---|---|
| 56,620 | Norway | June 2, 1936 |

OTHER REFERENCES

Sarbach, Synthetic Rubber Cements, II, in India Rubber World, July 1943, pages 363–367.

Gregory, Uses and Applications of Chemicals and Related Materials, vol. I, 1939, pp. 269 and 331. Reinhold Publishing Company, N. Y.

Mellan, Industrial Solvents, 1939, pp. 47–52. Reinhold Publishing Company, N. Y.

Rosin, Reagent Chemicals and Standards, 2d ed., 1946, p. 175. D. Nostrand Company, N. Y.